United States Patent Office 3,751,375
Patented Aug. 7, 1973

3,751,375
STABILIZATION OF POLYURETHANE COMPOSITIONS AND RESINS USED TO PREPARE POLYURETHANE COMPOSITIONS
Newell R. Bender, Cuyahoga Falls, and Ronald B. Spacht, Hudson, Ohio, assignors to The Goodyear Tire & Rubber Company, Akron, Ohio
No Drawing. Continuation-in-part of application Ser. No. 34,537, May 4, 1970, now abandoned. This application Feb. 29, 1972, Ser. No. 230,489
Int. Cl. C08g 51/58
U.S. Cl. 260—2.5 BB                 5 Claims

ABSTRACT OF THE DISCLOSURE

Polyurethane compositions, including polyurethane foam compositions, and resins from which said compositions are prepared, said compositions and resins being stabilized against degradation and discoloration by having incorporated therein phenolic antioxidants such as the reaction product of phenol and dicyclopentadiene, said reaction products having been subsequently alkylated with an olefin such as isobutylene.

---

This application is a continuation-in-part application of application Ser. No. 34,537 filed May 4, 1970, and now abandoned.

This invention relates to stabilized polyurethane compositions. It also relates to stabilized resins from which said compositions are prepared. More particularly, it relates to polyether resins and polyether-polyurethane compositions particularly foam compositions all of which are resistant to aging and discoloration.

Polyurethane compositions are susceptible to discoloration on heat aging. Many compounds used to stabilize conventional rubber, such as butadiene/styrene copolymers and natural rubber, do not satisfactorily stabilize polyurethane compositions against discoloration. A satisfactory stabilizer for polyurethane compositions should not only protect the polymer against discoloration and oxygen degradation, but should also protect the resin, from which the polymer is prepared, during storage, during the preparation of the polyurethane, and in the case of polyurethane foam, during the formation of the foam.

It is an object of the present invention to provide polyurethane compositions which are resistant to oxygen degradation and discoloration.

It is another object of this invention to provide resins which are resistant to oxygen degradation during storage and during the formation of liquid polyurethane or solid polyurethane, particularly polyurethane foam, therefrom.

In accordance with the present invention, polyurethane compositions including solid polyurethane, particularly polyurethane foam, liquid polyurethane, and resins used to prepare said compositions are effectively stabilized by having incorporated therein a small amount of a specific class of compounds prepared by a 2-step process which involves reacting one mol of dicyclopentadiene having the following structural formula:

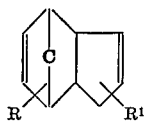

wherein R and R¹ are selected from the group consisting of hydrogen and methyl, with at least one mol of the phenolic compound selected from the group consisting of phenol, para-cresol, meta-cresol, para-ethyl phenol, and meta-ethyl phenol preferably in the presence of a Friedel-Craft type catalyst. More specifically, the phenolic materials that are effectively reacted with the dicyclopentadiene in accordance with the first step of the present process may be defined as phenolic compounds conforming to the following structural formula:

(II)

wherein $R^2$ is a radical selected from the group consisting of hydrogen, methyl, and ethyl and wherein $R^2$ is in a meta or para position. Preferred proportions of reactants in the resulting product are from 1.50 to 1.75 mols of phenolic compound per mol of the dicyclopentadiene. The reaction product of the dicyclopentadiene and phenolic compound is subsequently alkylated with at least ½ mol of a tertiary olefinic material per mol of the dicyclopentadiene, said tertiary olefinic material being selected from the group consisting of isobutylene, tertiary hexenes, and tertiary pentenes.

Examples of dicyclopentadienes having a structural formula according to (I) are as follows:

1-methyl dicyclopentadiene
2-methyl dicyclopentadiene
3-methyl dicyclopentadiene
4-methyl dicyclopentadiene
5-methyl dicyclopentadiene
6-methyl dicyclopentadiene
7-methyl dicyclopentadiene
1,4-dimethyl dicyclopentadiene
1,5-dimethyl dicyclopentadiene
2,5-dimethyl dicyclopentadiene
3,6-dimethyl dicyclopentadiene
2,3-dimethyl dicyclopentadiene
4,7-dimethyl dicyclopentadiene These two-stage reaction products are mixtures of compounds having the following structural formula:

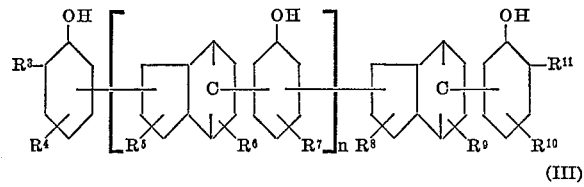
(III)

wherein $R^3$ and $R^{11}$ are tertiary alkyl radicals having from 4 to 6 carbon atoms and wherein $R^4$, $R^7$ and $R^{10}$ are selected from the group consisting of hydrogen, methyl, ethyl and tertiary alkyl radicals having from 4 to 6 carbon atoms and wherein $R^5$, $R^6$, $R^8$ and $R^9$ are selected from the group consisting of hydrogen and methyl and wherein $n$ is 0 or a positive integer of 1, 2 or 3.

Examples of compounds conforming to structural Formula III are represented below by a listing of specific radicals and values of $n$, any combination of which in the structural Formula III above represents a specific compound within the scope of the present invention.

| $R^3$ and $R^{11}$ | $R^4$, $R^7$ and $R^{10}$ | $R^5$, $R^6$, $R^8$ and $R^9$ | $n$ |
|---|---|---|---|
| t-Butyl | Hydrogen | Hydrogen | 0 |
| t-Pentyl | Methyl | Methyl | 1 |
| 1,1,2-trimethyl propyl | Ethyl | | 2 |
| | t-Butyl | | 3 |
| 1,1-dimethyl butyl | t-Pentyl | | |
| | 1,1,2-trimethyl propyl | | |
| | 1,1-dimethyl butyl | | |

In the above list of compounds $R^3$ and $R^{11}$ may be selected to be the same or different. The same is true of $R^4$, $R^7$ and $R^{10}$ and $R^5$, $R^8$ and $R^9$. The dicyclopentadiene variety and $R^3$, $R^4$, $R^7$, $R^{10}$ and $R^{11}$ may be attached to either the ortho, meta or para positions or the phenolic varieties, most preferably the ortho or para positions. Preferred compounds are those where tertiary alkyl groups are attached ortho to OH group.

The amount of olefinic material to be employed will depend upon the phenolic compound used and also upon the molar ratio of phenolic compound and the dicyclopentadiene in the reaction product. Thus the product prepared from phenol and dicyclopentadiene will react with more of the olefinic compound than the product from paracresol. Also a reaction product of phenol containing a 2:1 molar ratio of phenol and dicyclopentadiene will react with more olefin than a 1:1 product. While products that are incompletely alkylated possess superior antioxidant properties compared to unalkylated products, preferred products are those in which alkylation is substantially complete. Preferred proportions of reactants in the final alkylation product are from 1.0 to 2.0 mols of tertiary olefinic material per mol of the dicyclopentadiene when $R^2$ is not hydrogen, e.g., when para-cresol or para-ethyl phenol are reacted with the dicyclopentadiene to produce the product of step one. The preferred proportions of reactants in the final alkylation product are from 2.0 to 4.0 mols of tertiary olefinic material per mol of the dicyclopentadiene when phenol is reacted with the dicyclopentadiene to produce the product of step one. A slight excess of the alkylating agent is generally employed to assure that the desired amount reacts with the product from stage one.

The reaction between the dicyclopentadiene and the phenolic compounds is effectively catalyzed by a Friedel-Craft type catalyst, and in particular the more potent Friedel-Craft catalysts such as aluminum chloride, zinc chloride, ferrous and ferric chloride and boron trifluoride, as well as complexes based on boron trifluoride. Boron trifluoride and complexes based on boron trifluoride are preferred catalysts for the first step of the disclosed process. The second step of the above described two-step reaction process, wherein the product obtained by reacting the dicyclopentadiene and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the disclosed process. The catalysts employed in both the first and second stages of the disclosed process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the disclosed process it is not a particularly desirable alkylation catalyst since it tends to promote undesirable side reactions. It is therefore preferred to remove the boron trifluoride catalyst when it is employed in the first step of the reaction before proceeding with the second or alkylation step of the disclosed process. The boron trifluoride catalyst may be effectively removed by destroying it with a basic material such as ammonia, or a solution of sodium hydroxide or sodium carbonate. Alternatively the boron trifluoride catalyst may be removed along with excess phenolic materials by heating the reaction mixture to a temperature from 100° C. to 160° C. under vacuum. An additional method of removing the boron trifluoride catalyst employed in the first step of the disclosed process is by refluxing the reaction mixture from step one with a small quantity of an inert organic solvent such as toluene at a temperature between 150° C. and 160° C. In either of the latter two methods the boron trifluoride may be recovered and subsequently reused in catalyzing the reaction of step one. The acidic alkylation catalyst employed to catalyze the second step of the disclosed process is normally neutralized with a suitable basic material such as a sodium carbonate solution.

The reaction defined as step one of the disclosed two-step process wherein the dicyclopentadiene is reacted with a phenolic compound is conducted at a temperature from 25 to 160° C. Preferred reaction temperatures are between 80 and 150° C. The reaction between the dicyclopentadiene and a phenolic compound may be started at room temperature and since the reaction is quite rapid and exothermic the heat of reaction may be used to obtain the final reaction temperature. If adequate cooling facilities are available the reaction may be carried out on a continuous basis.

The molar ratio of phenolic compound to the dicyclopentadiene employed in the reaction mixture of stage one of the disclosed process can be varied from 1:1 or 5 or more:1 mols of phenolic compound per mole of the dicyclopentadiene. The proportions usually employed range from 2:1 to 4:1 mols of phenolic compounds per mol of the dicyclopentadiene, a preferred ratio being 3:1. The above preferred proportions of reactants provide for a substantial excess of the phenolic compounds beyond that which will actually react with the dicyclopentadiene. The molar proportions of phenolic compound which reacts with the dicyclopentadiene usually varies from 1:1 to 2:1 with the preferred molar ratio of reactants in the product obtained from step one of the disclosed process ranging from 1.50 to 1.75 mols of phenolic compound per mol of the dicyclopentadiene. In some instances it may be desirable to carry out stage one of the disclosed process in an inert organic solvent such as benzene, toluene, etc. The employment of a solvent is particularly desirable if a relatively low ratio of phenolic compound to the dicyclopentadiene is used. When the molar ratio of phenolic compound to the dicyclopentadiene is 3 or more:1 the excess phenolic compound acts as an effective solvent and no additional solvent need be employed. The excess, i.e., unreacted phenolic compound, can be separated from the phenolic compound/dicyclopentadiene reaction product of step 1 prior to the alkylation step, or it can remain with said product. In either case an alkylated composition results which can be used effectively within the practice of the present invention.

Step one of the present process may be carried out by adding the dicyclopentadiene to the mixture of phenolic compound and catalyst or the catalyst may be added gradually to the mixture of phenolic compound and dicyclopentadiene, the first of these two procedures is preferred. The rate at which the reactants are combined can vary over a wide range as long as the temperature is kept below 160° C.

The second step of the disclosed process involves alkylation of the reaction mass obtained in step 1. The reaction mass can be comprised of both the phenolic compound/dicyclopentadiene product and the excess, i.e., unreacted phenolic compound, or it may consist of just the phenolic compound/dicyclopentadiene reaction product, the unreacted phenolic compound being removed prior to the alkylation step. A solution of the reaction mass obtained from step 1 in an equal quantity of an inert hydrocarbon solvent such as benzene, toluene, etc., is used in carrying out the second step of the process. Alkylation is conducted at a temperature between 20° C. and 100° C. A preferred temperature range is between 60° C. and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however, the time within which the reaction is completed is dependent upon the activity of the alkylating agent used.

The hexylenes used herein include 2-methyl-1-pentene and 2-methyl-2-pentene. The amylenes include 2-methyl-1-butene and 2-methyl-2-butene.

Even extremely small amounts such as 0.1% by weight or 0.2% of one of the phenols of the general formula listed herein has a noticeable effect on improving aging properties of the polyether-urethanes. When the amount of the antioxidant is increased to about 0.4%, superior results are obtained. However, we generally prefer to incorporate about 0.5 to 3% of antioxidant based on the weight of polyether polyol. Larger amounts, say up to 4 or 5% may be used here the properties desired justify using an additional amount of antioxidant. The presence of these stabilizers also aids in stabilizing the polyol resins against degradation.

The following examples are illustrative of the preparation of the antioxidant compositions of the present invention but are not intended as limitations on the scope of the invention. Unless otherwise indicated, all parts are parts by weight.

EXAMPLE 1

Three hundred and thirty grams of para-cresol and 9.0 grams of a phenol $BF_3$ complex containing 26 percent $BF_3$ were heated to 100° C. and then 132 grams of dicyclopentadiene were added over a period of three and one-half hours. The excess para-cresol was removed by heating to a column temperature of 150° C. at 4 millimeters, this procedure also removed the $BF_3$ catalyst. A residue of 316 grams was obtained.

Two hundred and thirty-six grams of this product were dissolved in an equal weight of toluene and 4.0 grams of $H_2SO_4$ added. The solution was heated to 80° C. and 168 grams of isobutene added over a period of one and three-fourths hours. The mixture was heated one hour longer, then the catalyst was destroyed with a $Na_2CO_3$ solution. Volatiles and unreacted materials were removed by heating to 175° C. at 30 millimeters. Catalyst residues were removed by filtration. Weight of the product was 313 grams.

EXAMPLE 2

Three hundred and seventy-six grams of phenol and 9 grams of a phenol $BF_3$ complex containing 26 percent $BF_3$ were heated to 90° C. One hundred and thirty-two grams of dicyclopentadiene were then added in one hour between 90° C. and 107° C. The mixture was held at this temperature several hours longer. Then heated to 180° C. at 15 millimeters to remove the $BF_3$ and the unreacted phenol. A yield of 291 grams of a hard resin was obtained. The ratio of phenol to dicyclopentadiene was 1.69 to 1.

EXAMPLE 3

A 215 gram portion of the product from Example 2 was dissolved in 400 milliliters of toluene. Six grams of concentrated $H_2SO_4$ were added. The mixture was heated to 55° C. and isobutylene added in three and one-half hours or until no more was absorbed. The catalyst was destroyed with 12 grams of $Na_2CO_3$ dissolved in 50 milliliters of $H_2O$. The volatiles were removed by heating to 150° C. at atmospheric pressure and then flashing off the remainder at the same temperature at 15 millimeters. Three hundred and nine grams of product were obtained.

EXAMPLE 4

One hundred and seventy-four grams of a reaction product of para-cresol and dicyclopentadiene prepared according to Example 1 were dissolved in 200 milliliters of toluene and 6 grams of concentrated $H_2SO_4$ were then added to the solution. The solution was heated to 76° C. and 100 grams of 2-methyl-1-pentene added in one hour. The mixture was held between 60° C. and 70° C. for six hours longer. The catalyst was destroyed with 40 grams of 25 percent $Na_2CO_3$ solution. The mixture was then heated to a final pot temperature of 150° C. at 15 millimeters to remove volatiles. Two hundred and thirty-five grams of product were obtained.

EXAMPLE 5

Four hundred and one grams of para-ethyl phenol and 10 grams of a phenol $BF_3$ complex containing 26 percent $BF_3$ were heated to 84° C. and then 132 grams of dicyclopentadiene were added in two and one-half hours time. The mixture was then heated to 190° C. (pot temperature) at 10 millimeters to remove the $BF_3$ and the excess paraethyl phenol. Yield of product was 331 grams. The molar ratio of para-ethyl phenol to dicyclopentadiene was 1.63 to 1.

EXAMPLE 6

Two hundred and thirty-seven grams of the product from Example 5 were dissolved in 250 milliliters of toluene and 10 grams of concentrated $H_2SO_4$ were added to the solution. The mixture was heated to 65° C. and isobutylene added until no more would react, this took approximately three hours. Fifty grams of a 25 percent $Na_2CO_3$ solution were then added to destroy the catalyst and the whole mixture heated to 180° C. at 10 millimeters to remove volatiles. Weight of the product was 301 grams.

EXAMPLE 7

Three hundred and twenty-four grams of a mixed meta-para-cresol having a 3° boiling point range and 9 grams of a phenol $BF_3$ complex were heated to 80° C. and then 132 grams of dicyclopentadiene were added in two hours. The mixture was maintained at 80° C. and stirred one hour longer. The excess meta-para-cresol and the $BF_3$ were then removed by heating to a pot temperature of 190° C. at 10 millimeters. Weight of the product was 294 grams. This represents a 1.5 to 1 molar ratio of meta-para-cresol to dicyclopentadiene.

EXAMPLE 8

Two hundred and six grams of the reaction product from Example 7 were dissolved in 250 milliliters of toluene and 10 grams of concentrated $H_2SO_4$ added to the solution. The mixture was heated to 63° C. and 150 grams of 2-methyl-1-butene were added in two hours. The mixture was held at 60° C. for four more hours. The catalyst was then destroyed and the volatiles removed as in previous examples. Yield of the product was 263 grams.

In contrast to the compounds prepared in accordance with preceding Examples 1, 3, 4, 6 and 8, related reaction products prepared by a one-step reaction from dicyclopentadiene and phenolic compounds having hydrocarbon substituents were prepared for comparative purposes in accordance with the procedure outlined in the following examples.

EXAMPLE 9

Two hundred and fifty grams of 6-tertiary butyl-meta-cresol and 5.0 grams of a phenol $BF_3$ complex were warmed to 80° C. Then 66 grams of dicyclopentadiene were added in one hour. The mixture was heated at 80° C. for one hour longer. The unreacted materials and catalyst were removed by heating to 180° C. (pot temperature) at 10 millimeters. Weight of the product was 173 grams.

EXAMPLE 10

Five hundred grams of 6-tertiary butyl-ortho-cresol and 9.0 grams of a para-cresol $BF_3$ complex (26 percent $BF_3$) were mixed and then 66 grams of dicyclopentadiene added between 25 and 35° C. in seven hours. The catalyst was destroyed with a $Na_2CO_3$ solution and the mixture then heated to 190° C. at 8 millimeters to remove volatiles and unreacted 6-tertiary butyl-ortho-cresol. Weight of the product was 307 grams.

EXAMPLE 11

Two hundred grams of 2,4-ditertiary butyl phenol and 6 grams of a para-cresol $BF_3$ complex were heated to 80° C. and then 66 grams of dicyclopentadiene added in two hours. Reacted two hours longer then added a $Na_2CO_3$ solution to kill the catalyst and heated to 190° C. at 8 millimeters to remove volatiles and unreacted materials. Weight of the product was 196 grams.

EXAMPLE 12

Two hundred grams of 2,4-dimethyl phenol and 5.0 grams of a phenol $BF_3$ complex were heated to 77° C. Seventy-three grams of dicyclopentadiene were then added in one hour. The mixture was held at 80° C. for two more hours, then heated to 190° C. at 10 millimeters to remove catalyst and excess 2,4-dimethyl phenol. Weight of the product was 191 grams.

EXAMPLE 13

Five hundred grams of 6-tertiary butyl-para-cresol were mixed with 10 grams of a para-cresol $BF_3$ complex and heated to 68° C. One hundred and thirty-two grams of dicyclopentadiene were then added in one and one-half hours. The mixture was held at 80° C. for another hour. Volatiles and unreacted materials were removed by heating to 175° C. at 1 millimeter. Weight of product was 403 grams. Molar ratio of 6-tertiary butyl-para-cresol to dicyclopentadiene was 1.65 to 1.

EXAMPLE 14

Three hundred and seventy-two grams of para-methoxy phenol and 9.0 grams of a phenol $BF_3$ complex containing 26 percent $BF_3$ were heated to 85° C., 132 grams of dicyclopentadiene were added in three hours and the reactants then permitted to react one hour longer. The catalyst was destroyed with a $Na_2CO_3$ solution. The reaction mixture was then heated to 190° C. at 10 millimeters to remove unreacted materials. Weight of product was 319 grams. Molar ratio of para-methoxy phenol to dicyclopentadiene was 1.51 to 1.

EXAMPLE 15

Two hundred and thirty-five grams of the reaction product of Example 14 were dissolved in 400 milliliters of toluene and 6.0 grams of concentrated $H_2SO_4$ were added. The reaction mixture was then heated to 64° C. and isobutylene added slowly over several hours. The catalyst was destroyed with a $Na_2CO_3$ solution and the reaction mixture heated to 150° C. at 10 millimeters ot remove volatiles. Weight of the product was 291 grams.

EXAMPLE 16

Four hundred and five grams of para-cresol and 13.0 grams of a phenol $BF_3$ complex containing 26 percent $BF_3$ were mixed at room temperature. One hundred and thirty-two grams of dicyclopentadiene were then added in five minutes time. The temperature rose to 155° C. and then fell rapidly, the reactants were stirred for one-half hour longer and then heated to 190° C. at 10 millimeters to remove the catalyst and the excess para-cresol. Three hundred and eight grams of reaction product were obtained. This represents a molar ratio of para-cresol to dicyclopentadiene of 1.63 to 1. This product is then alkylated in the usual manner in accordance with the procedure described in the foregoing examples.

EXAMPLE 17

Three hundred twenty-four grams of p-cresol and 9.0 grams of p-cresol $BR_3$ complex (26% $BF_3$) were heated to 90° C. One hundred thirty-two grams of dicyclopentadiene were then added dropwise over a period of 45 minutes between 90° and 100° C. The mixture was stirred one-half hour longer. Then 100 milliliters of toluene were added. The mixture was refluxed for 2 hours to remove the $BF_3$. Three hundred sixty-seven grams of the mixture was then cooled to 60° C. and 6.0 grams of concentrated $H_2SO_4$ were added. Two hundred twenty-four grams of 2-methyl-1-pentene were added dropwise at 60° C. When the reaction was complete the $H_2SO_4$ was neutralized with aqueous saturated $Na_2CO_3$. The aqueous layer was allowed to settle and was decanted. The volatiles were removed by heating to a pot temperature of 155° C. at 45 millimeters pressure in the presence of a small quantity of anhydrous $Na_2CO_3$.

As stated earlier herein, it is not necessary to remove the excess phenol after the reaction with the dicyclopentadiene compound, but prior to the alkylation step. For example, in Example 1 rather than removing the para-cresol by heating to a column temperature of 150° C. at 4 millimeters, 100 milliliters of toluene can be added and the mixture refluxed for 1 or 2 hours until the $BF_3$ fumes disappear. Due to additional material available for alkylation, i.e., the para-cresol, additional catalyst, for example a total of 12.0 grams of $H_2SO_4$, would be used and additional isobutene used, e.g., until no more isobutene reacted.

Although the antioxidant compounds of the present invention are particularly effective in polyether resins and polyether-polyurethanes, particularly in polyether-polyurethane foams which have been subjected to high temperature conditions, particularly regarding resistance to discoloration under these conditions, they may also be used to stabilize polyester resins and polyester-polyurethanes.

The antioxidant compounds are beneficial for polyalkylene ether polyol-urethanes, such as polyalkylene ether glycol-urethanes including the polyethers containing alkyl side drains which are particularly vulnerable to degradation by humidity, aging and weathering.

The greatest improvement is obtained with polyalkylene ether glycol urethanes containing alkylene oxide units, such as propylene, butylene, isobutylene, isopropylene, and ethylene glycols and polyglycols or polyols formed of mixtures of these. However, good age resistance is also obtained in the case of alkylene ether glycol-polyether urethanes from other polyalkylene ether glycols such as polytetramethylene ether glycol, polyneopentylene ether glycol, and polypentamethylene ether glycol and other bifunctional polyglycols of the general formula $$HO—(RO)_n—H$$

where $n$ is an integer of 1 to 100 and R is an alkylene group such as isopropylene, ethylene, propylene, butylene, isobutylene, pentylene and the like or mixtures of these.

Representative examples of the polyether polyols which are being used commercially to produce improved polyether urethane foams and satisfactory for use in this invention are the ones prepared by the condensation of propylene oxide on glycerol and hexanetriol. Hence these polyether polyols have three reactive hydroxyls instead of two as is the case with the polyether glycols.

The reaction of an isocyanate group with an active hydrogen of a polyether forms a polymer with recurring linking units of the following general structure:

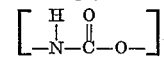

The long chain urethane polymer of the present invention has recurring units of the general formula:

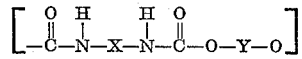

where X is a nucleus of a suitable organic diisocyanate as hereinafter described and —O—Y—O— is the residue of a polyether glycol from reaction with an organic diisocyanate.

The polyethers used to prepare cellular polyurethane products preferably have a molecular weight above 700 but those with a molecular weight as low as 500 to 600, or as high as 3500 or even somewhat higher, may be used, depending on the type of foamed material desired. The amount and rate of crosslinking determines the type of foamed material and the greater the amount of crosslinking, the more rigid the foamed material, and thus many types of improved cellular polyurethanes may be prepared according to the present invention. Both the amount and rate of crosslinking may be controlled by the use of cross linked polyethers and/or the use of crosslinking agents such as triisocyanates which have three isocyanate groups to promote crosslinking between the linear polyether molecular chains. Thus the diisocyanates used in this invention may be substituted in part with triisocyanates, particularly when rigid foams are desired. Other suitable crosslinking agents are polyhydroxy compounds such as trimethylol propane and aliphatic or aromatic glycols.

In the method of making the cellular materials, the foaming may be produced by rapid stirring preferably in a commercial foam machine by reaction of an isocyanate with water or carboxyl group to produce $CO_2$ upon decomposition of the excess diisocyanate. The foamed material may also be produced in a foam machine by gasifying a polyether-isocyanate at high pressure or by distributing $CO_2$ or a "Freon" gas, etc., therein during the reaction stage.

In the ordinary method of making cellular polyurethane or foamed polyether diisocyanate reaction products, a viscous, liquid polyether is pumped at a controlled rate through a nozzle. Polyisocyanate, preferably a diisocyanate having two and only two isocyanate groups, is pumped to a mixing chamber equipped with an outlet nozzle, where it contacts the stream of polyether and is thoroughly mixed therewith because of its high velocity or by means of a stirrer. A small amount of water is also introduced into the mixing chamber either as a stream or in admixture with the polyether. A suitable catalyst, such as certain tertiary amines is also preferably mixed with the polyether or introduced into the mixing chamber. A stirrer is also generally present in the mixing chamber to insure homogeneous mixing. From the mixing chamber, the material is incorporated into a suitable mold, such as an open pan, which is moved in a continuous manner relative to the mixing chamber to provide the desired layer of viscous reactants on the bottom of the pan or mold or by use of an inclined moving belt.

Polymerization starts as the materials are mixed and the semifluid mass is discharged onto the belt. The material mixing is very important. It is essential that the diisocyanate and catalyst be almost immediately and completely dispersed in the polyether. The rate of polymerization is relatively fast and the mass is shaped by the contour of the pans. Carbon dioxide is evolved in the gaseous state from the time of mixing, discharging and shaping stages.

The foamed materials of the present invention may be formed also by first reacting a polyether with a substantial excess of a diisocyanate over a 1:1 molar ratio in the absence of any water so as to form a dry partially reacted "prepolymer" so that there are free isocyanate groups present. The "prepolymer" is generally a viscous and flowable liquid, but if it is a waxy solid at room temperature, it can be made flowable by heating to 100° F. to 150° F. The antioxidants of the present invention may be incorporated with the polyalkylene ether glycol and polyisocyanate during the preparation of the prepolymer. Subsequently, the "prepolymer" is reacted with a combination of materials comprising water, a polyurethane reaction catalyst such as a tertiary amine and preferably a crosslinking agent containing a plurality of liabile hydrogens. This combination may be combined with additional resin prior to its combination with the prepolymer. There is a minimum of agitation employed after the initial dispersion of water in the "prepolymer" to prevent loss of $CO_2$. The amount of water used is generally 1 to 3 parts by weight based on 100 parts of resin to provide carbon dioxide for a low density product, although as low as 0.5 part by weight can be used to obtain benefits of this invention. Where more than 5 parts of water are used, the urea linkage formed apparently cause a decrease in some of the desirable properties of the foamed material such as resiliency.

As to suitable polyethers in making elastomers, in order to make rubbery urethanes, i.e., those which are rubbery at normal temperatures, the molecular weight of the polyether glycol should be above 500 and preferably about 1500 to about 3500. The maximum molecular weight of the polyether is dependent only upon the ability to economically make the polyethers of higher molecular weights with difunctionality, the higher molecular weights being preferred. Generally, it is exceedingly difficult to obtain polyethers with a molecular weight much above 3000 or 4000 without substantially higher costs and loss of some functionality.

The molar ratio of polyisocyanate to polyol is preferably about 8 to 1 to about 4 to 1 for suitable polyurethane foams, coatings and elastomers although benefits of this invention may be obtained with as low a molar ratio as 0.5 to 1 or as high as 10 or 12 to 1.

Generally for coatings, a range of about 1 to 3 mols per mol of polyol is used although polyether glycols may be used in the range of about 0.5 to 0.8 up to about 10 to 12 mols of diisocyanate per mol of polyether glycol.

As to using polyols for polyurethane coatings, the polyisocyanate and the polyol may be mixed in a solvent and spread upon the surface by similar means such as dipping, roller coating, knife coating, brushing or spraying. Upon heating the polymerization of the reaction products and evaporation of the solvent is accomplished.

For some purposes it may be desirable to substitute up to about 50% by weight of the polyethers by polyesters having a molecular weight of at least 500 such as poly-(propylene-ethylene)adipate and polyethylene adipate and poly(ethylene-butylene-1,4)adipate. However, aging resistance suffers when the polyether glycols are less than 90% by weight of the total polyols present.

The polyisocyanate compounds used for preparing the cellular rubber, solid rubber and films of the present invention are preferably organic compounds having two active isocyanate groups. Suitable diisocyanates are various aromatic and aliphatic diisocyanates such as naphthalene-1,5-diisocyanate, tolylene diisocyanate, p,p'-diisocyanato diphenyl methane, durene diisocyanate (2,3,5,6-tetramethyl para phenylene diisocyanate) and hexamethylene diisocyanate or mixtures of these.

Some triisocyanates may be used in conjunction with a diisocyanate, such as described above, when more rigidity is desired or when the polyether has insufficient trifunctionality to give the desired degree of branching.

EXAMPLE 18

Foam samples were prepared containing various stabilizers. A first set of foam samples was made by first treating an unstabilized polypropylene ether-triol having a molecular weight of about 3000 with 1 part by weight of stabilizer per 100 parts by weight of triol resin. One of the samples, Sample 1, contained no stabilizer while the other four samples, Samples 2, 3, 4 and 5, contained four different types of phenolic stabilizers, Sample 5 containing a stabilizer of the present invention. These samples of stabilized and unstabilized resin were allowed to stand at 25° C. for one week. Unstabilized resin was then added to each of the aged samples to dilute the antioxidant concentration to 0.5 part by weight per 100 parts by weight of resin. The foams were prepared from these samples using the following formula:

| Ingredients: | Parts by weight |
| --- | --- |
| (1) Resin plus antioxidant | 100 |
| (2) Water | 3.8 |
| (3) N-ethyl morpholine | 0.3 |
| (4) Triethylenediamine | 0.2 |
| (5) Silicone oil [1] | 1.0 |
| (6) Stannous octoate | 0.4 |
| (7) Toluene diisocyanate | 47 |

[1] The silicone oil is a water dispersible product and thought to be a polyoxyalkylene polydimethyl siloxane block copolymer where the alkylene is ethylene and higher.

The ingredients 2 through 6 were added to the resin plus antioxidant and thoroughly mixed. A commercial grade toluene diisocyanate (80/20 isocyanate mixture) was added to the mixture with vigorous agitation. The mixture was poured into 10 pound size rectangular paper bags. The bags were placed in a 250° F. oven for one-half hour after the foam had attained its maximum height.

A second set of foam samples was prepared in a similar manner with the exception that the resin was stabilized originally in 0.5 part by weight of the stabilizers and was incorporated into the foam within the same day without aging the stabilized resin. These samples were samples 6 to 10.

Test specimens one inch in thickness were cut from the oven-cured foam buns. To eliminate possible variations in density, which occur from the top of the bottom of a bun, samples being compared were selected from equivalent areas of the buns. Samples of the foams were subjected to compression testing both before and after aging for 96 hours at 250° C. at one pound per 50 square inches. The percent increases in compression are listed in Table I. Ninety percent compression set tests (percent retention of gauge) were also run on each of the foam samples. These data are also recorded in Table I. Various color ratings were also made and are included in Table I. Color determinations were made after oven aging the samples for 96 hours at 250° F. Color evaluations were also made after weatherometer agings under ultra violet light at a temperature of about 150° F. Color evaluations after window aging two weeks were also made.

Atlas Xenon Weatherometer (ASTM E42–57). Tensiles were obtained on aged and unaged films. The percent tensile retention was calculated from the aged and unaged tensiles. The results are tabulated in Table II.

TABLE II

| Samples | Stabilizer | Parts of stabilizer per 100 parts of rubber | Percent tensile retention |
|---|---|---|---|
| 11 | None | 0 | 60 |
| 12 | Reaction product similar to that of Example 1. | 0.7 | 96 |
| 13 | do | 1.4 | 81 |

As revealed by the above data, the solid polyurethane rubber containing a stabilizer of the present invention exhibited superior resistance to degradation when compared with an unstabilized polymer. In addition, after aging both of the stabilized polymers exhibited a color visibly superior to the unstabilized polymer.

The reaction product in Samples 5, 10, 12 and 13 was prepared by reacting para-cresol and dicyclopentadiene in approximately a 3/1 molar ratio using a phenol boron trifluoride complex as catalyst, removing the excess para-cresol and butylating with over one-half mol of isobutene. This is essentially the same product produced in Example 1 using essentially the same process but at a different time and on a larger scale.

The following stabilizers were added to a propylene ether-triol resin and a foam prepared the next day using

TABLE I

| Sample | Stabilizer | Original compression (lb./50 in.²) | Compression after oven aging 96 hours at 250° F. | Percent increase in compression | Color rating after oven aging 96 hours at 250° F. | 90% compression set (percent retention of gauge after one week) | Weatherometer 35.1 hours | Color rating, window aging, 2 weeks |
|---|---|---|---|---|---|---|---|---|
| 1 | None | 44.6 | 50.0 | 12.1 | 5 | 95.2 | All samples light brown. | 3 |
| 2 | Styrenated phenol | 57.5 | 65.5 | 13.9 | 3 | 94.6 | do | 3 |
| 3 | Butylated, styrenated m-p-cresol. | 51.2 | 57.3 | 11.9 | 3 | 94.8 | do | 3 |
| 4 | 2,6-ditertiary butyl-4-methyl phenol. | 49.8 | 52.5 | 5.4 | 3 | 95.2 | do | 1 |
| 5 | Reaction product similar to that of Example 1. | 54.2 | 61.7 | 13.8 | 1 | 94.2 | do | 3 |
| 6 | None | 48.7 | 51.9 | 6.6 | 5 | 95.3 | do | 3 |
| 7 | Styrenated phenol | 42.7 | 49.4 | 15.7 | 3 | 94.4 | do | 3 |
| 8 | Butylated, styrenated m-p-cresol. | 43.0 | 50.0 | 16.3 | 3 | 93.5 | do | 3 |
| 9 | 2,6-ditertiary butyl-4-methyl phenol. | 41.9 | 47.2 | 10.9 | 5 | 94.5 | do | 1 |
| 10 | Reaction product similar to that of Example 1. | 49.4 | 52.5 | 6.3 | 1 | 95.0 | do | 2 |

The above color ratings were made by a panel of individuals and their opinions tabulated and averaged. The above data indicate that the foam stabilized with the alkylated reaction product of p-cresol and dicyclopentadiene possessed much better color after long term high temperature aging (oven aging) than did any of the phenolic materials outside the scope of the present invention while at the same time retaining good resistance to foam degradation.

A prepolymer was prepared from one mole of polytetramethylene glycol ether having a molecular weight of about 1000 and two moles of tolylene diisocyanate (80/20 isomeric mixture). The prepolymer (100 parts) was diluted with toluene (65 parts). The prepolymer possessed an isocyanate content of 3.8 percent. To the diluted prepolymer (50 parts) was added a curative solution prepared from 5.2 parts of 4,4'-methylene bis(2-chloroaniline), 0.25 part of 2-mercaptobenzothiazole and 10 parts of methyl ethyl ketone.

In Samples 12 and 13, 0.25 part and 0.50 part of a reaction product similar to that of Example 1 were added to the diluted prepolymer. In Example 11 no stabilizer was added. Films of each of the compounded prepolymer solutions were drawn on polyethylene slabs and allowed to cure for 24 hours at room temperature. Test specimens were cut from the films and aged for 300 hours in an the same formulation as described earlier herein. The compression results obtained on all of the foam samples were satisfactory. The samples were color rated after oven aging 96 hours at 250° F. The results are in Table III. B, C and D are compounds within the practice of the present invention.

TABLE III

Stabilizer (parts [1]):     Color rating
- A (0.5) _____ 5
- A (1.5) _____ 5
- A (3.0) _____ 5
- B (0.5) _____ 3
- B (1.5) _____ 2
- B (3.0) _____ 1
- C (0.5) _____ 4
- C (1.5) _____ 4
- C (3.0) _____ 5
- D (0.5) _____ 4
- D (1.5) _____ 4
- D (3.0) _____ 5

[1] Parts:
A = 2,6-ditertiary butyl-4-methyl phenol.
B = Butylated reaction product of p-cresol and dicyclopentadiene.
C = Hexylated reaction product of p-ethyl phenol and dicyclopentadiene.
D = Amylated reaction product of p-ethyl phenol and dicyclopentadiene.

In B, C and D, the molar ratio of the phenolic compound to the dicyclopentadiene was approximately 3/1. A p-cresol BF$_3$ complex was used as the catalyst in the first step of the reaction. In excess of ½ mol of olefin was used in the alkylation step for B, C and D.

B was superior to A at all levels. C and D were superior to A at the 0.5 and 1.5 part levels.

It appears that where phenol is the phenolic compound, discoloration would probably be greater than when other phenolic compounds such as p-cresol are used.

Mixtures of the phenolic compounds (reactants) can be used in the practice of the present invention. Therefore where the phrase "at least one phenolic compound" is used herein, any of the phenolic compounds or mixtures thereof can be used.

A particularly preferred range of antioxidants used within the practice of the present invention is from 0.25 to 1.5 parts of the antioxidant per 100 parts by weight of the polyol resin. Even more preferred is a range from 0.50 to 1.5 parts. Most preferred is a level from .50 to 1.0 part.

While certain representative embodiments and details have been shown for the purpose of illustrating the invention, it will be apparent to those skilled in this art that various changes and modifications may be made therein without departing from the spirit or scope of the invention.

What is claimed is:

1. A polyether polyurethane foam prepared from polyol resin, the polyol resin having incorporated therein 0.25 to 1.50 parts by weight, per 100 parts by weight of resin, of a reaction product formed by (1) reacting, in the presence of Friedel-Craft type catalyst, one mole of dicyclopentadiene and at least one mole of at least one phenolic compound selected from the group consisting of p-cresol, meta cresol, p-ethyl phenol and meta-ethyl phenol and (2) further reacting the first reaction product with at least one-half mol of an olefin selected from the group consisting of isobutylene, tertiary amylenes, and tertiary hexylenes, said reaction product containing a mixture of compounds having the following structural formula

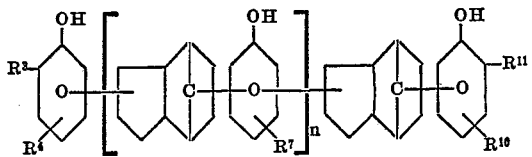

wherein R$^3$ and R$^{11}$ are tertiary alkyl radicals having from 4 to 6 carbon atoms and wherein R$^4$, R$^7$ and R$^{10}$ are selected from the group consisting of hydrogen, methyl, ethyl and tertiary alkyl radicals having from 4 to 6 carbon atoms, and wherein $n$ is 0, 1, 2, or 3.

2. The composition according to claim 1 wherein the first reaction product is reacted with the olefin in the presence of an acidic alkylation catalyst.

3. The composition according to claim 2 wherein the dicyclopentadiene is reacted with the phenolic compound at a temperature of from 25° C. to 160° C. and wherein the Friedel-Craft type catalyst is selected from the group consisting of boron trifluoride and complexes based on boron trifluoride.

4. The composition of claim 3 wherein the phenolic compound is p-cresol and the olefin is isobutylene, R$^3$ and R$^{11}$ are tertiary butyl radicals and R$^4$, R$^7$ and R$^{10}$ are methyl radicals.

5. A polyether polyurethane foam prepared from polyol resin, the polyol resin having incorporated therein 0.25 to 3.00 parts by weight, per 100 parts by weight of resin, of a reaction product formed by (1) reacting, in the presence of Friedel-Craft type catalyst, one mol of dicyclopentadiene and at least one mole of p-cresol and (2) further reacting the first reaction product with at least one-half mol of isobutylene, said reaction product containing a mixture of compounds having the following structural formula:

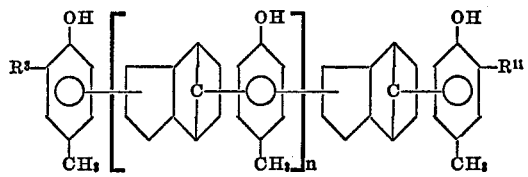

wherein R$^3$ and R$^{11}$ are tertiary butyl radicals and wherein $n$ is, 0, 1, 2, or 3.

References Cited
UNITED STATES PATENTS

| | | | |
|---|---|---|---|
| 3,036,138 | 5/1962 | Mingasson et al. | 260—45.95 |
| 3,305,522 | 2/1967 | Spacht | 260—45.95 |
| 2,915,496 | 12/1959 | Swart et al. | 260—45.7 |
| 3,027,351 | 3/1962 | Lichty | 260—45.95 |
| 3,538,046 | 11/1970 | Oertel et al. | 260—2.5 |
| 3,494,880 | 2/1970 | Austin | 260—2.5 |
| 3,423,503 | 1/1969 | York | 260—45.95 |

OTHER REFERENCES

Antioxidants, by Bayern; 1971; Noyes Data Corp., Park Ridge, N.J., pp. 12 and 32.

Polyurethanes, Chem. and Tech., Pt. I—Chemistry by Saunders et al., Interscience Publishers, 1962; pp. 42–48.

Polyurethanes, Chem. and Tech., Pt. II—Technology by Saunders et al., Interscience Publishers; 1964, pp. 211–216.

HOSEA E. TAYLOR, Primary Examiner

V. P. HOKE, Assistant Examiner

U.S. Cl. X.R.

260—45.95 R, 45.95 H, 611.5